United States Patent [19]

Nishibori

[11] Patent Number: 5,080,292
[45] Date of Patent: Jan. 14, 1992

[54] METHOD FOR PULVERIZING GELATIN, AND PAINT, COATING LAYER, FILM AND FINISHED CLOTH

[76] Inventor: Sadao Nishibori, 1-9-206, Higashi shinagawa 1-chome, Shinagawa-ku, Tokyo, Japan

[21] Appl. No.: 311,499

[22] Filed: Feb. 16, 1989

[30] Foreign Application Priority Data

| Mar. 3, 1988 | [JP] | Japan | 63-48774 |
| Mar. 3, 1988 | [JP] | Japan | 63-48776 |
| May 21, 1988 | [JP] | Japan | 63-123021 |
| Oct. 14, 1988 | [JP] | Japan | 63-257321 |
| Dec. 23, 1988 | [JP] | Japan | 63-323491 |

[51] Int. Cl.$^5$ .................. B02C 21/00; C07K 3/00
[52] U.S. Cl. .................. 241/21; 241/5; 241/39; 530/355
[58] Field of Search .......... 241/16, DIG. 14, 15, 241/5, 39, 21; 530/355

[56] References Cited

U.S. PATENT DOCUMENTS

| 976,827 | 11/1910 | Ostberg . | |
| 1,302,463 | 4/1919 | Campbell . | |
| 1,954,462 | 4/1934 | Tainton | 241/16 X |
| 2,039,262 | 4/1936 | Schulte . | |
| 2,069,568 | 2/1937 | Wieder | 241/16 X |
| 2,257,726 | 10/1941 | Emmitt . | |
| 2,433,727 | 12/1947 | Arnold . | |
| 3,157,524 | 11/1964 | Artandi . | |
| 3,654,865 | 4/1972 | Tamai | 430/112 |
| 3,663,472 | 5/1972 | Raymond | 260/6 |
| 3,665,061 | 5/1972 | Eberly, Jr. . | |
| 3,692,523 | 9/1972 | Tamai | 430/119 |
| 3,756,518 | 9/1973 | Bailey | 241/65 |
| 3,788,845 | 1/1974 | Osawa et al. | 430/97 |
| 4,057,607 | 11/1977 | Soehngen et al. | 260/28 |
| 4,221,342 | 9/1980 | Tadema et al. | 241/DIG. 14 |
| 4,235,959 | 11/1980 | Thijs et al. | 430/531 |
| 4,834,762 | 5/1989 | Nishibori | 8/94 |

FOREIGN PATENT DOCUMENTS 50-149768 12/1975 Japan .
586232 3/1947 United Kingdom .

OTHER PUBLICATIONS

World Patent Index Abstract, JP 2091279 Kokoku Chem. Ind. K.K., Mar. 1990.
WPI Abstract, JP 1294740 AINKK, Nov. 1989.
WPI Abstract, JP 1192874 AINKK, Aug. 1989.
WPI Abstract, JP 1222954 AINKK, Sep. 1989.
WPI Abstract, JP 1222938 AINKK, Sep. 1989.
WPI Abstract, JP 1186320 EINKK, Jul. 1989.
WPI Abstract, JP 63-194765 AINKK, Jun. 1988.
WPI Abstract, JP 62-221357, JEXKK, Sep. 1987.

Primary Examiner—George F. Lesmes
Assistant Examiner—Terrel Morris
Attorney, Agent, or Firm—Shlesinger, Arkwright & Garvey

[57] ABSTRACT

This invention relates to a method for pulverizing gelatin and to products in which pulverized gelatin is used. The present invention relates to a method for pulverizing hydrophilic and water-soluble dry gelatin with relatively high jelly strength using as a medium hydrophilic organic solvent dimethylformamide or organic solvent admixed with dimethylformamide in an atmosphere where moisture is shut out. It further relates to paints containing synthetic resin solutions in dimethylformamide or the organic solvent admixed with dimethylformamide which contains gelatin particles pulverized into 30 microns or smaller in size by the invention method. It provides paint layers, coating layers, films and finished cloths that are formed by using said paints and synthetic resin solutions. By eluting gelatin particles with hot water, paint layers, coating layers, film and finished cloths with excellent moisture permeability can be obtained.

19 Claims, 1 Drawing Sheet

METHOD FOR PULVERIZING GELATIN, AND PAINT, COATING LAYER, FILM AND FINISHED CLOTH

The present invention relates to a method for pulverizing hydrophilic and water-soluble gelatin into ultrafine particles, and to paints and synthetic resin solutions containing gelatin pulverized by the present invention method, as well as to coating layers, films and finished cloths that are made of synthetic resin solution containing gelatin pulverized by the invention method.

The present invention also relates to a method for pulverizing gelatin which prevents gelatin from becoming sol as it absorbs water in the air, which enables gelatin to maintain its particulate state, and which prevents explosion of vaporized gas from organic solvent during pulverization.

The present invention aims at providing synthetic resin paints and synthetic resin solution for various uses which contain a suspension of ultrafine gelatin particles pulverized by the present invention method.

The present invention further aims at providing painting layer, coating layer, film, and finished cloth with smooth surface and excellent moisture absorbency that are made of or impregnated with synthetic resin containing uniformly distributed ultrafine gelatin particles of uniform size.

Still further, the present invention provides highly moisture permeating porous layers of coating, paint, films or finished cloths which are perforated with minute holes by eluting with hot water the ultrafine gelatin particles contained in the paint layer, film or finished cloth made of synthetic resin.

According to the present invention, gelatin particles under pulverization are prevented from becoming fused with one another and maintain the state of being independent and discrete. This makes the gelatin powder optimal for manufacturing porous paint layers, coating layers, films and finished cloths.

Conventionally, the porous structure was formed by foaming the synthetic resin layer which constitutes the coating layer and the like. Or, coating layers and the like that are made of hydrophilic organic solvent solution of polyurethane resin were immersed in water to remove the solvent as well as to coagulate polyurethane to thereby form the porous structure. When compared with such porous structure, the pores formed according to the present invention are finer and more uniform in size. It is also possible by the present invention to distribute such pores in the coating layers and the like in any desired amount.

By pulverizing gelatin into ultrafine and yet discrete "particles", resultant products such as paint layers, coating layers, films and finished cloths made of synthetic resin will have excellent feel, higher moisture permeability and water resistance as compared with the conventional porous products such as paint layers and films.

BACKGROUND OF THE INVENTION

Natural leathers have the unique texture and feel with adequate moisture absorbency as well as unique gradual moisture and air permeability. They are made of entangled colagen fibers that are unique to them and have higher toughness as compared with other cloth materials.

Natural leathers are, however, limited in supply and some are quite scarce while others are extremely expensive. Natural leathers in general are usually more expensive than other woven or knitted fabrics made of natural or synthetic fibers. Natural leathers are further defective in that as they are supplied in the shape and size of their original animals, they not only require cutting and sewing operations but are inconvenient in providing larger-sized products with consistent texture. Still further, when left standing under moist conditions for an extended period of time, they tend to become swollen and too soft or become stretched, losing the shape and strength.

Various types of artificial and synthetic leathers have therefore been developed and used to substitute natural leathers. Such artificial and synthetic leathers are grained or embossed to give as natural appearance as possible such as that of crocodiles or snakes. Aggregates with moisture absorbency are often admixed to give them excellent feel and moisture permeability without tackiness similar to that of natural leathers. Micropores are also formed in them to obtain similar effect.

As a typical example, it is known to apply water miscible organic solvent solution of polyurethane elastomer on a substrate made of knitted, woven or nonwoven fabric, immerse the substrate in water to remove the solvent as well as to coagulate polyurethane to form a porous layer on the substrate. Artificial or synthetic leathers with porous layers thus formed on the substrate are, on one hand, comparable to natural leathers in draping property, texture and feel and have excellent moisture permeability. On the other hand, they lack strengths such as wear resistance, and thus cannot be used as they are. The porous layer formed on the substrate by any one of the above mentioned methods is irregular in its pore size, shape and distribution depending on the conditions. The above mentioned methods are therefore not satisfactory for manufacturing artificial and synthetic leathers with uniform moisture permeability and water resistance on a mass production basis. Moreover, because of inferior wear resistance, conventional artificial and synthetic leathers must be reinforced on the surface by applying a surface treatment agent comprising an organic solvent solution of polyurethane resin on the porous layer formed on the substrate and heating and drying the same. This, however, entails a defect that the moisture permeability of the porous layer will be hampered by the reinforcement layer.

An attempt is therefore made to manufacture artificial or synthetic leathers having both the wear resistance and moisture permeability by gravure coating said reinforcement layer in dots on the porous layer. However, the resultant product is insufficient both in the wear resistance and moisture permeability; and the moisture permeability is not uniform over the entire surface of the product.

It has also been proposed to manufacture artificial or synthetic leathers by mixing powder of natural skin/leather in a resin solution such as of polyurethane resin and applying the solution on the surface of a substrate. Alternatively, said powder of natural skin/leather is mixed in a resin material such as polyurethane resin to manufacture leather-like sheets and films. Still another method comprises the use of a solvent solution mixed with the powder of natural skin/leather to give leather-like finish on the paint layer, coating layer and the like.

There is an attempt to wash out a portion of natural skin/leather powder contained in the coating layer and the like.

Notwithstanding excellent moisture absorbency and feel comparable to that of natural leather, conventional artificial and synthetic leathers are defectively low in moisture permeability, if any at all. The moisture absorbency itself is limited to the extent which the natural skin/leather powder contained in the product can absorb, and it is not possible for the product to continuously absorb a large amount of water. Another defect of the conventional products of artificial or synthetic leathers is that as it is not possible to completely wash out the skin/leather powder contained therein other than the soluble components, the products will not attain porous structure.

With the foregoing in the background, the development of artificial and synthetic leathers in the form of sheets, films and coating layers having sufficient moisture permeability, water resistance and excellent wear resistance is long awaited. Requirements of such products to be developed are that the pores giving rise to moisture permeability be finer and uniform in size and that these pores be uniformly and more densely distributed. The products to be developed are required to have moisture absorbency as well, if necessary.

None of the requirements are met in the artificial and synthetic leathers according to the conventional methods in which the natural skin/leather powder is mixed in the course of production, or in which a porous layer is formed by applying a water-miscible organic solvent solution of polyurethane elastomer on the substrate and by immersing in water to wash out the solvent as well as to solidify polyurethane.

The present inventors conceived an idea of admixing hydrophilic and water-soluble gelatin into a solution of synthetic resin paint or a solvent solution of synthetic resin to be used in manufacturing synthetic resin paint layer, coating layer, film or finished cloth. This method of admixing hydrophilic and water-soluble gelatin into synthetic resin paint solution or synthetic resin solvent solution is advantageous in a number of aspects.

For one, gelatin to be admixed in the paint solution or solvent solution of synthetic resin is incorporated in such products as paint layer, coating layer, film or finished cloth instead of becoming dissolved in the solvent. Hydrophilic and water-soluble gelatin incorporated in the products exhibits excellent moisture absorbency and is easily dissolved by hot water, whereby the resultant products will have moisture permeability imparted by gelatin incorporated therein. It is also possible to wash out hydrophilic and water-soluble gelatin incorporated in the products with hot water to leave pores in the products.

The present inventors therefore made an attempt to form paint layers and films by admixing hydrophilic and water-soluble gelatin into paint solution or solvent solution of synthetic resin. Our experiments demonstrated that gelatin to be admixed in the synthetic resin solution must be an ultrafine powder of at least smaller than 30 microns in particle size to obtain excellent paint layers and the like products.

When the particle size of gelatin to be admixed is larger than 30 microns, the resultant products such as films and resin layers formed on the finished cloths can not be formed thin. As a result, the products will not have soft feel or sufficient moisture permeability because of the thickness.

When the thickness of the films or the resin layer formed on finished cloths is reduced, gelatin particles admixed in the resin would come out to project from the surface, giving rugged feel. Cracks would also develop from the periphery of the projecting gelatin particles, and the film starts to tear.

When gelatin particles are eluted from thin films and the like, large pores will be left, making the products brittle and deteriorating the water resistance. Water is also found to infiltrate into the products from the surface.

It was therefore concluded from our experiments that the particle size of gelatin powder to be admixed in the paint solution or solvent solution of synthetic resin for forming paint layers, films and the like must be in the range smaller at least than 30 microns.

An attempt was therefore made to pulverize hydrophilic and water-soluble gelatin into particles of less than 30 microns in size (the shorter diameter is cited herein in the case of elongated particles). Hydrophilic gelatin was thoroughly dried and subjected to experimental pulverization in a small amount using a pulverizer with sufficiently dry atmosphere, to obtain ultrafine powder of substantially 30 microns in size. However, when the water content of the gelatin to be pulverized increased, gelatin particles became sol and fused with one another, making it impossible to continue pulverization. Particularly when pulverized in a pulverizer such as a ball mill, gelatin particles were observed to become fused with one another with time. It was also found that this fusion of gelatin particles takes place as the particles absorb the water contained in the pulverizer to become sol. This is more markedly observed when the temperature inside the pulverizer rises.

In forming such products as paint layers and finished cloths using ultrafine gelatin powder of approximately 30 microns, gelatin particles were found to remain in the liquid in the form of flocculates instead of being dispersed when the particle size is smaller than 30 microns. The reason for gelatin particles in flocculates to remain in the solution is not known. It is assumed from the fact that the solution has a high viscosity that flocculates of gelatin particles are enveloped by the viscous liquid and thus prevented from dispersing.

Unless gelatin is subjected to pulverization using a special experimental apparatus, gelatin particles under pulverization in air will absorb the water contained in the air to become sol especially because the temperature inside the pulverizer rises and become fused with one another, making micronization impossible.

Another attempt was made to dry and cool gelatin and pulverize thus dried and cooled gelatin using a special apparatus. It is noted that use of this special apparatus is more costly and is not therefore suitable for pulverizing gelatin in large volume.

Under such circumstances, the present inventors have developed a method for pulverizing gelatin in dimethylformamide or an organic solvent admixed with dimethylformamide, said method being characterized in that gelatin particles do not become sol by absorbing moisture during pulverization and that pulverized gelatin is easily eluted with hot water.

OBJECTS AND SUMMARY OF THE INVENTION

An object of the present invention is to provide a gelatin pulverization method which can prevent hydrophilic gelatin from becoming sol by absorbing moisture and from becoming fused and viscous flocculates and which enables gelatin to be pulverized in the form of suspension in dimethylformamide or an organic solvent admixed with dimethylformamide.

Another object of the present invention is to provide pulverized gelatin powder which is finer than 30 microns in particle size, or more specifically smaller than 20 microns or 11 microns, with each particle of gelatin retaining its discrete "particle" form by pulverizing gelatin in dimethylformamide which is a hydrophilic organic solvent or in an organic solvent admixed with dimethylformamide.

Still another object of the present invention is to pulverize hydrophilic and water-soluble gelatin without impairing the water-soluble property of gelatin by pulverizing gelatin in dimethylformamide which is an hydrophilic organic solvent or an organic solvent admixed with diethylformamide.

Still another object of the present invention is to provide gelatin powder which is dispersed in dimethylformamide or an organic solvent admixed with dimethylformamide in the form of a suspension instead of becoming flocculates, to thereby provide paints and solvent solutions of synthetic resins made of organic solvents containing said pulverized gelatin dispersed in the form of suspension.

Still another object of the present invention is to eliminate oxygen in the pulverizer for pulverizing gelatin using dimethylformamide or an organic solvent admixed with dimethylformamide so as to prevent explosion of vaporized organic solvent which is the medium for pulverization as well as to prevent oxidation of gelatin.

Still another object of the present invention is to provide thin layers of paint and resin coating, thin films and thin surface layers for finished cloths.

Still another object of the present invention is to provide paint layers, coating layers, films and finished cloths by pulverizing gelatin into ultrafine particles so that said ultrafine particles to be contained in the product paint layers, coating layers, films and finished cloths will not project on the surface to roughen the same and yet will give adequate moisture permeability thereto.

Still another object of the present invention is to provide paint layers, coating layers, films and finished cloths by pulverizing gelatin into ultrafine particles so that said ultrafine particles to be contained in the product paint layers and the like will be prevented from floating on the product surface to thereby cause tears and cracks developing from the periphery of the gelatin particles.

Still another object of the present invention is to provide paint layers, coating layers, films and finished cloths by pulverizing gelatin into ultrafine particles without impairing water-soluble property of gelatin so as to facilitate elution of said gelatin with hot water and further to provide product paint layers and the like having numerous micropores left by elution and removal of the gelatin particles.

Still another object of the present invention is to arrange the particle size of gelatin powder uniform so that the product paint layers and the like will have pores of uniform target size in target density by adjusting the amount of gelatin contained therein.

Still another object of the present invention is to remove a very thin layer from the product paint layers and the like or from one or both side(s) of the product films by treating the product surface with buffing, sanding and the like so as to enable smooth elution and removal of gelatin powder contained therein and to improve moisture permeability of the resultant pores.

Still another object of this invention is to provide and form securedly paint layers, coating layers, films and finished cloths which can satisfy required moisture permeability and water resistance.

Still another object of the present invention is to form a paint layer and the like or laminate a film containing ultrafine particles of gelatin on the surface of artificial leather and the like having a porous layer of polyurethane resin so as to give high wear resistance and moisture permeability to said artificial leather and the like by dissolving and removing gelatin particles contained in the paint layer and the like.

In summary, the present invention method relates to wet pulverization of gelatin using dimethylformamide or an organic solvent admixed with dimethylformamide as a medium. Gelatin to be used is hydrophilic and is dried to a level at which its water-soluble property is not impaired. Further, pulverization is conducted in an atmosphere where water content is substantially shut out in order to prevent gelatin particles under pulverization from dissolving into sol to become fused. Typically according to the present invention, gelatin is pulverized in an atmosphere where oxygen and water are substantially shut out by using inactive gas such as nitrogen and carbon dioxide gases. Gelatin is typically pulverized into particle size of 30 microns or less, ideally less than 20 microns and more ideally less than 11 microns. Synthetic resin paints and synthetic resin solvent solution containing ultrafine gelatin particles are produced by using gelatin thus pulverized into ultrafine particles and suspended in an organic solvent. Further, by using the synthetic resin paints and synthetic resin solvent solution thus obtained, paint layers, coating layers, films and finished cloths containing ultrafine gelatin particles are produced. Still further, by dissolving and removing ultrafine gelatin particles contained in the coating layers, films or finished cloths with hot water, porous coating layers and the like are obtained. Alternatively, by removing a very thin layer from said coating layers and the like, at least a portion of ultrafine gelatin particles contained therein will come out on the surface.

The present invention thus relates to a method of pulverizing gelatin and intermediate products produced by the method as well as final products made of such intermediate products. Other objects of the present invention will become apparent from the description given below and the scope of the patent claims.

Specific examples of the present invention will now be described.

To facilitate understanding, examples will be given separately in terms of the pulverization method and of application of gelatin pulverized according to the present invention. The first portion of the description therefore relates to the details of pulverization method of gelatin while the latter portion relates to synthetic resin paints, synthetic resin solvent solution, coating layers, films, finished cloths and the like.

Pulverization of Gelatin

The method of pulverizing gelatin according to the present invention will be described. Gelatin to be pulverized is hydrophilic and water-soluble, which is dried to contain less than 12 wt %, more preferably less than 10 wt % of water. Gelatin thus prepared is subjected to wet pulverization using dimethylformamide or an organic solvent admixed with dimethylformamide as a medium in an atmosphere where water content in the apparatus is substantially removed. Wet pulverization is continued until gelatin particles will become 30 microns or less in particle size, ideally less than 20 microns and more ideally 11 microns.

As a more effective pulverization method, inactive gases such as nitrogen or carbon dioxide gases may be sealed in the pulverization apparatus to substantially shut out oxygen. In this manner, explosion of organic solvent vaporized during pulverization may be prevented.

Figure 1:
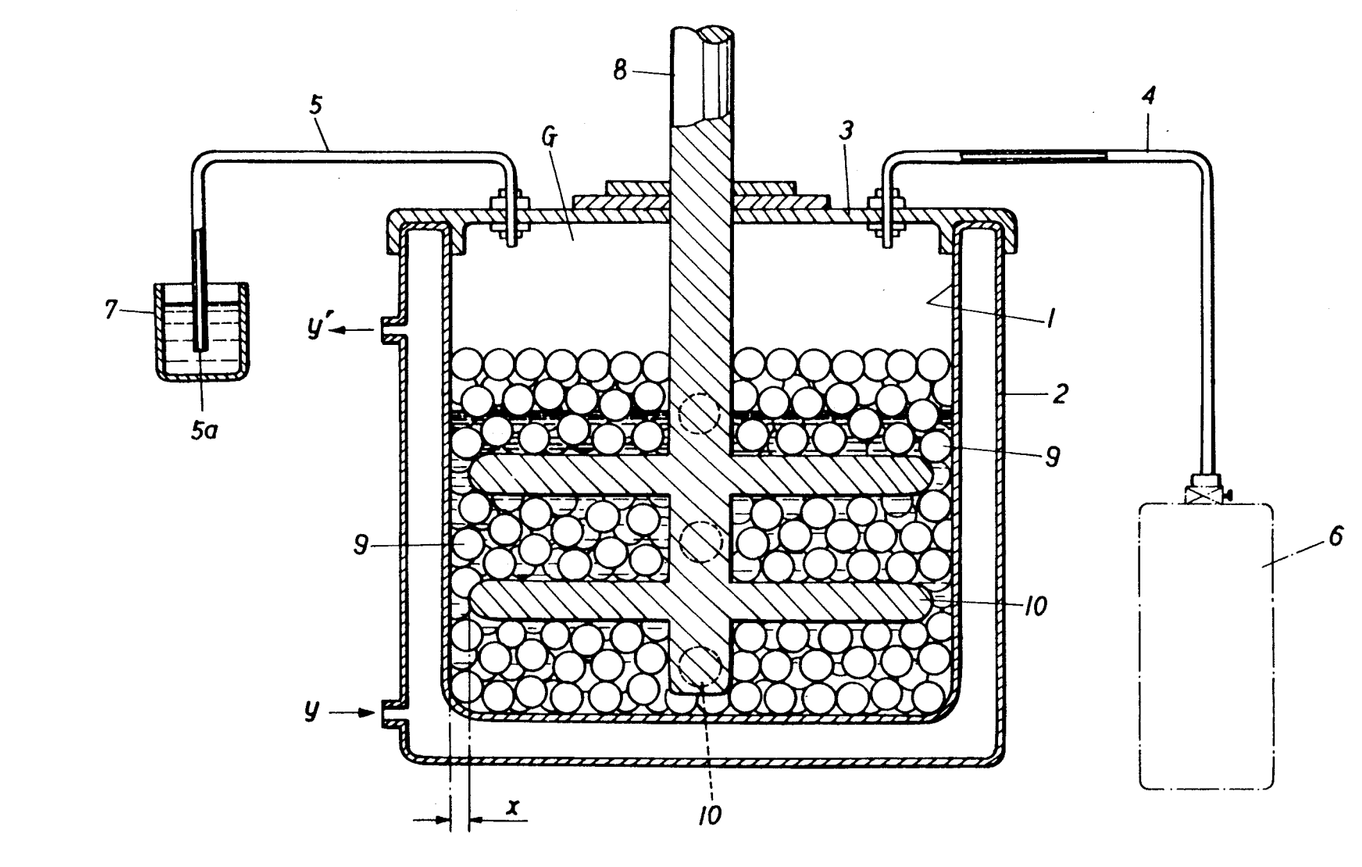
Accompanying drawing is given to explain various modes of embodiments in concrete terms by way of an example and shows a schematic view of a pulverization apparatus in which water is substantially shut off.

The accompanying drawing shows a pulverization apparatus generally known as a ball mill with wet medium. The pulverization apparatus shown in the drawing facilitates understanding of the present invention method.

In the ball mill with wet medium, a jacket 2 envelopes the periphery of a pulverizing tank 1, and cooling water is supplied into the jacket 2 from the arrow y and exhausted from the arrow y' to cool the tank 1. The tank 1 is held completely air-tight by a cover 3 and connected with a feed pipe 4 and exhaust pipe 5, said feed pipe 4 being connected to a gas cylinder 6. The end 5a of the gas exhaust pipe 5 is submerged in a water seal pot 7 to set a predetermined water column pressure inside the tank 1. A rotary shaft 8 extending both the inside and the outside of the tank 1 is provided with mixing arms 10, 10 . . . for mixing balls filled in the tank 1.

The tank 1 of the pulverization apparatus with the above construction is charged with dimethylformamide or an organic solvent admixed with dimethylformamide as a medium for wet pulverization and then with hydrophilic and water-soluble gelatin essentially in powder form. The gelatin to be charged is preferably dried to a level which does not impair hydrophilic and water-soluble property of gelatin. The smaller the water content, the less likely it is for the gelatin particles to become sol during pulverization. For practical reasons, the water content of gelatin must be set at 12 wt % or less.

Particularly, the lower the water content of gelatin, the less likely it is for gelatin to become sol during pulverization, making it suitable for the process. However, when the water content is extremely low, gelatin loses its hydrophilic and water-soluble property. When gelatin loses hydrophilic and water-soluble property, it can not be eluted with hot water from product films and the like and thus can not be used in forming porous films and the like. Therefore, gelatin must be dried to a level which does not impair hydrophilic property and water-solubility of gelatin. On the other hand, when the water content is too high, gelatin particles become sol and fused with one another, thereby making pulverization impossible.

Also, gelatin to be used is preferably lower in jelly strength, or 137 Bloom(g) or lower (by single method) and more particularly lower than 70 Bloom(g). The higher the jelly strength, the more likely it is for gelatin particles to become viscous flocculates during pulverization. Gelatin with lower jelly strength is therefore preferable. Jelly strength is closely related to water content of gelatin: gelatin with higher water content and jelly strength is more likely to become viscous and coagulated.

Organic solvent to be used as the medium is ideally dimethylformamide. Solvents of mixed dimethylformamide and methyl ethyl ketone and the like may also be used.

Dimethylformamide is most suitable as the medium organic solvent as it is incompatible with but has affinity to gelatin and is hydrophilic itself. Toluol, methyl ethyl ketone and the like were found unsuitable. It is difficult to obtain gelatin particles of 30 microns or less in particle size by the use of toluol monomer or methyl ethyl ketone monomer unless the water content of gelatin is reduced to substantially zero. However, gelatin with very low water content will lose its hydrophilic and water-soluble property. Even if the particle size of 30 microns or less is obtained with such gelatin, it is not possible to elute gelatin particles with hot water from the product film and the like formed by using the same.

Although it is not quite clear why dimethylformamide is optimal for pulverization of gelatin, it is assumed that hydrophilic property of both dimethylformamide and gelatin plays an significant role. In other words, it is assumed that gelatin charged in dimethylformamide becomes swollen, with its water content gradually migrating into dimethylformamide during pulverization. It is judged that this makes it difficult for gelatin particles to become sol and fused with one another during the process.

The assumption that dimethylformamide which is hydrophilic organic solvent becomes contained in gelatin is supported by the fact that the gelatin particles are surely eluted from the product film and the like formed by using the gelatin pulverized as above. In other words, when the product film and the like formed by using gelatin pulverized in dimethylformamide is washed with hot water, gelatin particles contained in the film are easily dissolved into hot water, leaving micropores in the film. It is considered that gelatin particles contained in such film are heated and become sol when the film is immersed in hot water, and are dissolved therein together with hydrophilic dimethylformamide contained in gelatin.

On the other hand, in case non-hydrophilic organic solvent such as toluol and methyl ethyl ketone is used as the pulverization medium, gelatin can not be pulverized into fine particles and it becomes difficult to arrange the particle size smaller than 30 microns. It is also difficult to elute gelatin particles contained in product film with hot water. With the use of non-hydrophilic solvent, pulverization is possible only when the water content of gelatin is reduced to substantially zero. Gelatin with higher water contents could not be pulverized.

It is assumed that the water content in gelatin particles remains as it is during pulverization when such non-hydrophilic organic solvent is used as the medium. Swelling phenomenon of gelatin particles as observed in the case of dimethylformamide did not take place during pulverization, making it impossible to pulverize gelatin into ultrafine particles.

When films were formed using gelatin particles pulverized by using said non-hydrophilic organic solvent, it was difficult to elute gelatin particles contained inside the film even when the film was immersed in hot water. The main reason for gelatin particles contained inside the film not to be eluted with hot water is attributable to non-hydrophilic property of the medium solvent.

In view of the foregoing, organic solvent to be used in the present invention is limited to dimethylformamide or an organic solvent admixed with dimethylformamide.

Gelatin to be pulverized is a kind of protein derivatives typically containing 80 wt % or more of protein, 16 wt % or less of water, 20 wt % or less of ash with the balance being lipids, calcium, and polysachharides, and is incompatible with the organic solvent used. Hydrophilic and water-soluble gelatin is particularly used in the present invention. As gelatin to be pulverized by the present invention is particularly high in equilibrium water content and more susceptible to moisture changes than other hydrophilic polymers, it is preferable to dry the gelatin to contain less than 12 wt %, more ideally 10 wt % or less of water. During this drying process, or in preliminary pulverization under a dry condition, a portion of gelatin particles may become hydrophobic; however, no particular problem is encountered in the use of such gelatin.

It is noted that gelatin to be pulverized is preferably lower in jelly strength. When the jelly strength is higher than 137 Bloom(g), gelatin particles may become viscous and fused with one another during pulverization. Ideally, the jelly strength of gelatin is 70 Bloom(g) or lower.

It is more preferable to subject gelatin to preliminary pulverization to make the particle size uniform. When pulverized, gelatin that had been subjected to preliminary pulverization for uniform particle size became finer and less varied in particle size after final pulverization in a shorter time.

Commercial hydrophilic gelatin powder may be subjected to preliminary crushing using a dry pulverizer such as a hammer mill to a particle size in the range which does not impair hydrophilic and water-soluble property and then filtered using a suitable sieve of for example 250 microns in mesh.

Gelatin thus prepared is charged into the tank 1 together with said dimethylformamide or an organic solvent admixed with dimethylformamide. The blending ratio of gelatin and organic solvent is ideally gelatin 1:organic solvent 2 in weight but it may be 1:1, except that the more the amount of gelatin, the longer it takes for pulverization.

The wet pulverization apparatus used here is a ball mill with a wet medium; the specifications of the apparatus are automatically determined by the amount of gelatin to be pulverized. For example, when the capacity of the tank 1 is given as 5.4 liters, the amount of 3 mm$\phi$ ceramic balls 9 is 2.4 liters, and the rotary shaft 8 will be provided with five stages of mixing arms 10 and rotated at 200 rpm. A clearance x of 12 mm is provided between the arms 10 and the inner wall of the tank 1.

"Pulverization" according to the present invention means cutting, impact pulverization or grinding. In a common ball mill, impact pulverization and grinding mainly takes place while in a ball mill with a wet medium such as shown in the drawing, grinding mainly takes place. Any type of pulverizer may be used in the present invention so long as it is capable of pulverization in the sense used herein. The present invention apparatus is in no way limited to a ball mill or ball mill with wet medium.

Balls 9 to be used in the present invention are ideally ceramic balls such as of zirconia or alumina base ceramics. It was found that stainless steel balls caused gelatin particles to become viscous and fused with one another. It is assumed that gelatin particles in contact with stainless steel balls become sol by the frictional heat the steel balls per se hold. No metal balls are therefore used in pulverization according to the present invention.

Prior to pulverizing gelatin, air inside the tank 1 is exhausted and the tank is filled with dehydrated gas in the space G. Dehydrated gas is sealed in the space G of the tank 1 because both dimethylformamide which is the pulverization medium and gelatin are hydrophilic. Moisture in the space G is directly absorbed either by gelatin particles or by dimethylformamide to thereby cause particles to become sol and make pulverization difficult. It is therefore necessary to feed dehydrated gas in the space G to shut out moisture therefrom. Nitrogen gas dehydrated to contain ca. 10 ppm of water, carbon dioxide gas, or dry air dehydrated to contain ca. 50 ppm of water may be used to fill the space G in the tank 1. Allowable limit of water content in the gas to be sealed in the tank 1 is relative to the water contents of gelatin to be charged and of the organic solvent as well as the jelly strength of gelatin to be pulverized. Generally, organic solvents are small in water content, and when dimethylformamide containing 0.01 wt % of water is used, for example, the water content of the organic solvent is hardly a significant factor in determining the allowable water content of said gas, which is determined solely by the water content of gelatin to be pulverized and the jelly strength. When gelatin has a smaller water content, the gas may contain correspondingly more water without causing any adverse effect on pulverization.

It is noted that the allowable water content of the gas to be sealed in the tank 1 is also influenced by the temperature inside the tank 1. Generally, the higher the temperature in the tank 1, the more likely it becomes for gelatin particles to become sol. Cooling water of ca. 25° C. is therefore preferably supplied to the jacket 2 to maintain the temperature inside the tank below 60° C. and to prevent temperature rise therein due to pulverization. Ideally, the tank 1 is cooled to a temperature below 40° C.

Cooling of the tank 1 to a temperature below 40° C. is favorable not only for pulverizing gelatin but also for minimizing vaporization of the dimethylformamide or an organic solvent admixed with dimethylformamide and facilitating handling of vaporized gas.

Use of inactive gas such as nitrogen gas and carbon dioxide gas to be sealed in the space G of the tank 1 prevents gelatin under pulverization from coming in direct contact with the atmospheric air and thus preventing the same from being oxidated. Moreover, by substituting the air inside the space G with the inactive gas, explosion of vaporized organic solvent filling in the space G may be prevented.

In view of the foregoing, the tank 1 is constantly supplied with a gas such as nitrogen gas at a predetermined pressure to increase the pressure inside the tank 1 so as to effectively shut out moisture and oxygen from the tank 1. To do this, the pressure inside the tank 1 is set at 10 to 20 mm on water column. More specifically, a gas cylinder 6 is connected to the tank 1 and the end 5a of the exhaust pipe 5 submerged in the water seal pot 7 is adjusted in depth to control the pressure inside the tank 1.

When the water content in the space G is removed by using carbon gas, carbon dioxide gas, nitrogen gas, or dry air, it is noted that the lower the water content, the less likely it is for gelatin particles to become sol and the more suitable it is for pulverization. However, it is not necessary to decrease the water content to zero. Water contained in the space G is removed in order to prevent gelatin particles from becoming sol and thus becoming fused with one another and coagulated. Therefore, no problem is foreseen even if gelatin particles become sol so long as the particles remain suspended in dimethylformamide or an organic solvent admixed with dimethylformamide. And, the space G in the tank 1 may contain water within this range.

Oxygen in the space G of the tank 1 is removed using inactive gas such as carbon dioxide and nitrogen in order to prevent vaporized organic solvent from exploding inside the tank 1. Therefore, oxygen inside the tank 1 is removed to a level where no explosion of the vaporized gas takes place.

Any type of inactive gas other than said nitrogen or carbon dioxide may be used so long as it is suitable for substituting the air inside the space G of the tank 1. Carbon dioxide is particularly used when dimethylformamide admixed in an organic solvent such as methyl ethyl ketone is used as the medium since this gas is easily absorbed by dimethylformamide. On the other hand, nitrogen gas is suitably used in the apparatus according to the present invention as it will not be absorbed by dimethylformamide.

Details of pulverization of gelatin will now be described.

Hydrophilic and water-soluble gelatin with low jelly strength is first subjected to preliminary crushing using a dry pulverizer provided with a high speed rotary bar for pulverization. Preliminary crushing is conducted to make the particle size uniform and to decrease the water content to a specific value of less than 12 wt %, for example to 6-10 wt %. Utmost care should be taken to prevent gelatin from becoming hydrophobic due to temperature rise during crushing. However, no problem was observed in use even when a portion of the gelatin particles became hydrophobic. Gelatin having uniform particle size by the preliminary crushing and decreased water content of less than 12 wt %, particularly less than 10 wt % is blended with dimethylformamide or an organic solvent admixed with dimethylformamide in an amount equal to or half the amount of the solvent and charged into the tank 1.

Gas such as dry air dehydrated to contain ca. 10-50 ppm of water, nitrogen gas and carbon dioxide gas is sealed in the space G of the tank 1 and the arms 10 are driven.

With the capacity of 5.4 liters, the tank 1 is filled with 2.4 liters of 3 mm$\phi$ ceramic balls 9, 1,200 g of dimethylformamide and 600 g of gelatin. The rotary shaft 8 was rotated at 200 rpm for 3 to 6 hours to obtain gelatin particles having the target particle size of ca. 10 $\mu$m. The pulverization time may be adjusted depending on such factors as pulverizing capacity of the apparatus and the amount of gelatin charged. In this example, pulverization was continued until the particle size of charged gelatin became ca. 10 $\mu$m.

Cooling water is supplied into the jacket 2 so that the temperature inside the tank will not exceed 60° C., or more preferably 40° C. Although the cooling temperature of the tank 1 is naturally set below the boiling point of the solvent to be used for the purpose of preventing dimethylformamide or an organic solvent admixed with dimethylformamide from boiling, it is also intended to minimize vaporization of the solvent and to prevent the gelatin particles from becoming sol as much as possible. The cooling temperature is therefore ideally set at 40° C. or lower.

Gelatin charged in the tank is pulverized in an atmosphere where the water content is substantially shut out, or where gelatin hardly becomes sol during pulverization. This atmosphere where gelatin particles hardly become sol is obtained by limiting the water content of the gas to be sealed in the space G to a level determined on the basis of the water contents of dimethylformamide or an organic solvent admixed with dimethylformamide and of gelatin, and the temperature inside the pulverizer. The water content of the gas for the atmosphere is therefore not fixed but is determined arbitrarily depending on the cases. However, the drier the gas sealed in the space G, the more effective it becomes to prevent gelatin particles from becoming sol. It is therefore ideal to use dehydrated dry air with water content of 10-50 ppm or nitrogen or carbon dioxide with water content of 10-20 ppm.

Said atmosphere where gelatin particles hardly become sol includes the one where no sol is formed and where sol is formed to some extent, the latter being where gelatin particles remain suspended in the organic solvent and not fused with one another despite a portion thereof becoming sol. It is therefore determined that water content which gives rise to slight formation of sol is the maximum allowable limit for the gas in the tank 1.

Surface active agent such as monochlorobenzene was added in an amount of 2 wt % as against gelatin for pulverization. Monochlorobenzene gives no adverse effect on dimethylformamide or on gelatin but functions as a dispersant, preventing sedimentation or solidification of gelatin particles under pulverization.

Ultrafine particles of gelatin thus ground are dispersed in dimethylformamide or an organic solvent admixed with dimethylformamide in the form of a suspension and maintain each independent and discrete form.

The present invention method is therefore capable of mass production of ultrafine gelatin particles having the particle size of for example from 30 $\mu$m to 10 $\mu$m or smaller.

EXAMPLE 1

Hydrophilic and water-soluble gelatin powder with jelly strength of 68 Bloom(g) (S-00623 by Nippi) was subjected to preliminary crushing using a dry pulverizer (T-400 by Turbo Kogyo) having pulverizing bars on the periphery of a rotor and filtered with a sieve of 250 microns (hereinunder expressed in $\mu$m) in mesh size to obtain uniform particle size. Said preliminary crushing was conducted to an extent which did not cause gelatin powder to become hydrophobic but until the particles became small enough to filter with said sieve.

Distribution of particle size after classification with the sieve is given below:

Smaller than 250 $\mu$m mesh and larger than 106 $\mu$m mesh: 36.27 wt %

Smaller than 106 $\mu$m mesh and larger than 75 $\mu$m mesh: 21.32 wt %

Smaller than 75 $\mu$m mesh and larger than 38 $\mu$m mesh: 32.62 wt %

Smaller than 38 $\mu$m mesh: 9.79 wt %

Gelatin particles thus classified were adjusted to contain 7.9 wt % of water and then pulverized in an apparatus for pulverization shown in the drawing. The apparatus comprises a tank 1 with the capacity of 5.4 liters, 2.4 liters of alumina base ceramic balls with 3 mm diameter charged therein, a rotary shaft 8 with the rotational speed of 200 rpm, five stages of cross-shaped arms 10,10 ... for mixing attached to the rotary shaft, and a clearance x of 12 mm between the arms 10 and the inner wall of the tank 1.

Into the apparatus were charged 1,200 g of dimethylformamide, 600 g of gelatin and 12 g of monochlorobenzene. Nitrogen gas was supplied into the space G of the tank 1 from a gas cylinder 6 and the air inside the tank 1 was completely removed by maintaining the pressure in the space G at 20 mm on water column. Nitrogen gas used here contained 10 ppm of water, and was supplied continuously from the cylinder with the nozzle pressure of 150 kg/cm$^2$ into the space G.

Tap water at 25° C. was continuously supplied into a jacket 2 to maintain the temperature inside the tank 1 at 35° C.

Pulverization was continued for 6 hours while rotating the shaft 8 at 200 rpm. During the entire process, gelatin particles did not become sol or fused with one another but remained suspended in dimethylformamide, maintaining each discrete form of ultrafine particles. The particle size distribution was measured to be smaller than 11 μm, as given below:

Larger than 10.55 μm and smaller than 14.92 μm: 0.0 wt %

Larger than 7.46 μm and smaller than 10.55 μm: 7.5 wt %

Larger than 5.27 μm and smaller than 7.46 μm: 14.2 wt %

Larger than 3.73 μm and smaller than 5.27 μm: 17.3 wt %

Larger than 2.63 μm and smaller than 3.73 μm: 18.5 wt %

Larger than 1.69 μm and smaller than 2.63 μm: 14.4 wt %

Larger than 1.01 μm and smaller than 1.69 μm: 10.4 wt %

Larger than 0.66 μm and smaller than 1.01 μm: 7.7 wt %

Larger than 0.43 μm and smaller than 0.66 μm: 7.5 wt %

Larger than 0.34 μm and smaller than 0.43 μm: 2.5 wt %

Larger than 0.24 μm and smaller than 0.34 μm: 0.0 wt %

It is noted that gelatin particles suspended in dimethylformamide had hardly become sol but maintained perfect particle form. No adhesion of gelatin particles was observed on the inner wall of the tank 1, balls 9 or mixing arms 10. It is particularly noted that no significant change in the load on the rotary shaft 8 was observed during pulverization, nor was there any increase in the viscosity of the solvent. Oxidation of gelatin particle was not observed during pulverization, indicating that gelatin substantially maintained its original state of when charged.

EXAMPLE 2

Pulverization was conducted under identical conditions as in Example 1 except that dry air containing 20 ppm of water was used as the ambient gas in the tank 1.

Sufficient care was taken in supplying cooling water into the jacket 2 to suppress vaporization of dimethylformamide. Pulverization proceeded substantially in the same manner as in Example 1 except for a trace of oxidation observed in pulverized gelatin.

COMPARATIVE EXAMPLE 1

Gelatin was pulverized under identical conditions as in Example 1 except that air containing moisture was supplied in the tank 1. The air containing 1.48 g/1000 liters of water was supplied into the space G at the rate of 1,500 cc/m for pulverization for 6 hours. In total, 540 liters of dry air containing 1.48 g/1,000 liters were supplied into the space G.

The upper layer of the dimethylformamide solution became thicker with time to finally become a viscous layer. Viscous flocculates of fused gelatin particles were observed in the intermediate and lower layers of the solution as well.

When pulverization was further continued, a viscous mass of coagulated gelatin particles was separated from dimethylformamide and formed into the mass taking the balls 9 therein, and pulverization was no longer possible.

Viscous flocculates of gelatin particles also adhered on the shaft 8 and the mixing arms 10. The balls 9 were caused to adhere on the peripheral wall of the tank 1 by the viscous flocculates, filling the clearance x provided between the arms 10 and the tank 1 and making it impossible to continue pulverization.

Gelatin subjected to this pulverization had become sol with the particles fused with one another. Discrete form of particles observed at the time of charging was completely destroyed and it was impossible to measure the particle size. Discoloration due to pulverization was also observed.

In the Comparative Example, care had to be taken to maintain the temperature inside the tank 1 constantly below 35° C. to prevent explosion of vaporized gas.

EXAMPLE 3

Pulverization was conducted under identical conditions to those of Example 1 except for the water content of gelatin to be pulverized, which was 12 wt % in this example.

Although gelatin particles were observed to slightly become sol with time, no adverse effect on pulverization was found. Gelatin particles obtained were more varied in particle size than those obtained in Example 1 but were sufficiently small for practical use.

COMPARATIVE EXAMPLE 2

Pulverization was conducted under identical conditions to those of Example 1 except for the water content of gelatin powder to be charged in the tank 1. The gelatin contained 12.5 wt % of water in this example. Likewise in Example 1, nitrogen gas of 10 ppm was sealed into the tank 1 for pulverization.

The medium dimethylformamide solvent generally became viscous with time and a gradual increase in flow resistance was observed.

When the pulverization was continued, gelatin particles became fused and formed into flocculates.

When the pulverization was further continued, a viscous mass of gelatin particles such as in Comparative Example 1 was formed as it had been separated from dimethylformamide. The balls 9 were incorporated in the mass and viscous gelatin adhered on the shaft 8 and the arms 10. The balls 9 adhered with one another by the gelatin filled the clearance x between the arms 10 and the tank 1, making it impossible to continue pulverization. It was therefore impossible to obtain gelatin particles smaller than 30 microns in Comparative Example 2.

EXAMPLE 4

Pulverization was conducted under identical conditions to those of Example 1 except that gelatin used was 137 Bloom (g) in jelly strength and contained 5.8 wt % of water.

Gelatin particles in dimethylformamide were found to slightly become sol but no problem was encountered in pulverization. Resultant ultrafine gelatin particles were substantially 15 $\mu$m or smaller in size.

COMPARATIVE EXAMPLE 3

Pulverization was conducted under identical conditions to those of Example 1 except that gelatin used was 137 Bloom(g) in jelly strength and contained 10.4 wt % of water.

Gelatin particles in dimethylformamide were found to become viscous and fused with one another. Particle sizes were not uniform and greater than 30 $\mu$m.

EXAMPLE 5

Pulverization was conducted under identical conditions to those of Example 1 except that a mixed solvent containing 800 g of dimethylformamide used in Example 1 and 400 g of methyl ethyl ketone with water content of 0.01 wt % or less was used as the solvent, nitrogen gas with water content of 10 ppm as the ambient gas and zirconia base ceramic balls of 3 mm in diameter as the balls 9.

Because of vaporization, additional 200 g of methyl ethyl ketone had to be charged during pulverization process. However, gelatin particles smaller than 15 $\mu$m in size could be obtained.

COMPARATIVE EXAMPLE 4

Gelatin was pulverized under the same conditions as those of Example 1 except that the solvent used was 1,200 g of methyl ethyl ketone.

Although gelatin was not observed to be fused within methyl ethyl ketone with one another, the particle size obtained was greater than 30 $\mu$m. Gelatin was not able to be pulverized into the particle size practically usable.

COMPARATIVE EXAMPLE 5

Pulverization was conducted under the same conditions as those of Example 1 except that 1,200 g of toluol was used as the solvent. The result was identical to that obtained in Comparative Example 4.

COMPARATIVE EXAMPLE 6

Pulverization was conducted under the same conditions as those of Example 1 except that gelatin used contained 0.1 wt % of water.

Gelatin could be pulverized into ultrafine particles without becoming fused with one another to a particle size of smaller than 10 $\mu$m. However, resultant gelatin particles were no longer hydrophilic and thus incapable of moisture absorption. The particles did not dissolve in hot water, and were therefore not suitable for forming porous films.

COMPARATIVE EXAMPLE 7

Pulverization was conducted under the same conditions as those of Comparative Example 4 except that gelatin used contained 0.1 wt % of water. The result was identical as that obtained in Comparative Example 6.

COMPARATIVE EXAMPLE 8

Pulverization was conducted under the same conditions as those of Comparative Example 5 except that gelatin used contained 0.1 wt % of water. The result was identical as that obtained in Comparative Example 6.

Applications of Pulverized Gelatin

Ultrafine particles of gelatin pulverized by the above mentioned method were all smaller than 30 $\mu$m and further smaller than 20 $\mu$m in particle size. Particles as small as 11 $\mu$m or smaller were even obtained by the method of Example 1. Ultrafine particles are uniformly dispersed in dimethylformamide or an organic solvent admixed with dimethylformamide in the form of suspension with each particle maintaining its discrete "particle" form.

By using dimethylformamide or an organic solvent admixed with dimethylformamide containing the ultrafine gelatin particles as the solvent for synthetic resin paints, it is possible to obtain solutions of synthetic resin paints containing the ultrafine gelatin particles.

By using dimethylformamide or an organic solvent admixed with dimethylformamide containing the ultrafine gelatin particles as the solvent for various synthetic resins such as polyurethane, solutions of synthetic resins containing ultrafine gelatin particles can be obtained.

It is noted that as gelatin may react with isocyanate or aldehyde to become insoluble in water, it should preferably be avoided as much as possible to admix gelatin into synthetic resin paints, solutions or adhesives containing isocyanate or aldehyde groups.

It is also possible to obtain paint layers of 5-30 $\mu$m in thickness and containing the ultrafine gelatin particles by using such synthetic resin paints.

Synthetic resin paints for forming paint layers containing the ultrafine gelatin particles and having the thickness of 5-30 $\mu$m may include any synthetic resin paint which is compatible with dimethylformamide or an organic solvent admixed with dimethylformamide containing said gelatin or any which can be diluted with said organic solvents. Solvent-type synthetic resin paints are particularly used. Typically one-pack polyurethane resin paints and various others may be used.

Addition of gelatin particles to such synthetic resin paints was in the range of from 100 to 20 wt %, preferably between 70 and 30 wt %. With larger addition of gelatin, the moisture permeability and air permeability of the resultant paint layers improved while strength of the paint layers showed a marked decrease. When the addition was too small, the resultant paint layers would have excellent strength but moisture and air permeability was not sufficient.

Any of the conventional methods of forming paint layers could be used because gelatin particles contained in the synthetic resin paints were very fine. Typically, such coating means as roll coater, air spray, and airless spray curtain flow coater was used to form a paint layer of 5-30 $\mu$m in thickness on various articles, sheets and films. The paint layers thus formed are free of tackiness because of moisture absorbing performance of the ultrafine gelatin particles contained therein. Because of the contact resistance of gelatin particles, the paint layers will have a high frictional resistance, providing a surface which is less slippery.

By slightly buffing or sanding off the surface of the paint layer, ultrafine gelatin particles will surely come out on the surface, improving moisture absorbency and contact resistance.

Ultrafine gelatin particles contained in the paint layers were then dissolved and removed with hot water at 80°-120° C. Dissolution and removal of particles was conducted both on the paint layers with and without buffing or sanding process. Moisture permeability of the paint layers after buffing or sanding process was by far higher than that of the paint layers without such process.

It is then possible to form various films or laminated films by using the solution of synthetic resins containing said ultrafine gelatin particles, or form coating layers on knitted, woven or non-woven fabrics by directly coating the solution on the substrate. It is also possible to form finished cloths by impregnating substrate of such fabrics with synthetic resin containing the ultrafine gelatin particles.

Synthetic resins for forming films, laminated films coating layers and impregnated layers include substantially any type of synthetic resins so long as they are compatible with or can be diluted with dimethylformamide or an organic solvent containing said gelatin particles.

The thinner the films, laminated films, coating layers and the like, the more suitable it is for giving moisture permeability. It is therefore preferable to form films and the like in a thickness of 5-30 μm. Because the particles are extremely small in size, the resultant films and the like, even though they are extremely thin, will not develop tears or cracks.

Gelatin particles are added in an amount of 100-20 wt % as against the synthetic resins for forming the films and the like, more preferably between 70 and 30 wt %. When the addition of gelatin particles as against the synthetic resin is larger than said range, the resultant films and the like will have an improved moisture permeability but markedly decreased strength. On the other hand, when the addition is smaller than said range, then the resultant films and the like will have a significantly lower moisture permeability.

Such films can be formed by the conventional methods of forming resin films. It is also possible to apply the solution of synthetic resin containing gelatin particles on a release paper and peel off the coated layer of resin from the release paper to form a film.

Coating layers can be formed on knitted, woven or non-woven fabrics, synthetic leathers, artificial leathers, natural leathers, resin sheets, papers and wooden plates by coating the solution in a thickness of 5-30 μm by known coating methods.

Using a doctor knife, solution of synthetic resin containing gelatin particles may be applied in a thickness of 5-30 μm on a release paper with or without grain pattern. The layer of synthetic resin thus coated on the release paper may be transferred and bonded on a substrate of various types by fusion or with adhesive while peeling off the release paper to form laminated film. The lamination may be in one or more layers. It is preferable to add the gelatin powder in the adhesive when the adhesive is used to bond the laminating film on the substrate. This makes it possible to dissolve and remove the gelatin powder with hot water from both the film surface as well as the substrate. The step of washing with hot water will be described elsewhere below. The substrate may include knitted, woven or non-woven fabrics, synthetic leathers, natural leathers, resin sheets, papers and the like.

The substrate to be impregnated with the solution of synthetic resins containing gelatin particles include knitted, woven or non-woven fabrics. The resin solution may be impregnated in the substrate by immersing the substrate in the solution or by applying the solution on the substrate with a roll, or by any other conventional methods used for impregnating the resin solutions. The thickness of the resin layer to be impregnated in the substrate is preferably in the range of 5-30 μm.

Films, finished cloths with a coating layer or laminated film layer and the like thus formed and having the thickness of 5-30 μm are washed with hot water to dissolve and remove gelatin particles contained therein.

Films, finished cloths or the like are immersed in hot water at 80°-120° C. to completely dissolve and remove gelatin particles. Generally, it takes 30-120 minutes to fully dissolve and remove the same.

Gelatin particles contained in these films or finished cloths are assumed to contain the medium solvent, dimethylformamide. It is further assumed that gelatin particles that have become swollen by dimethylformamide subsequently become sol by the action of hot water, causing vaporization of dimethylformamide, and dissolve into hot water.

When finished cloths are squeezed with a roll, the ratio of removal of gelatin particles will be increased. Preferably, the interval between two rolls through which the finished cloths are to be passed to squeeze off the liquid is set narrower than the thickness of the cloths so as to press the cloths therebetween. Ratio of gelatin removal is improved when the finished cloths were pulled at a rate of 100-500 m/min at a pressure of 1-4 kg/cm$^2$ in hot water.

Said films or finished cloths will then be subjected to buffing or sanding on one or both sides to remove a thin layer from the surface. It is more preferable to buff or sand them prior to the elution of gelatin particles, but it may be conducted after elution. Other methods than buffing or sanding such as shot blasting may be employed to remove a thin layer from the surface. Or, a thin layer may be sliced off from the surface.

Films, finished cloths and the like thus formed are excellent in moisture permeability and water resistance and sufficient in wear resistance.

Films and finished cloths thus formed are provided with uniformly distributed numerous fine pores smaller than 30 μm, or more particularly smaller than 20 μm. The smallest pores measured 10 μm or smaller in diameter.

Since the moisture vapor such as perspiration from human body is 0.0004 μm in diameter which is smaller than said pore diameter, the moisture vapor may easily permeate through the pores. As the rain drops are ca. 2,000 μm in diameter, said films and finished cloths shut off the rain drops. Even very fine drops of rain can be shut off as they are ca. 100 μm in diameter. Water resistance of the films and finished cloths is therefore satisfactory.

A solution of urethane resin containing 100 parts of urethane resin solution with solid urethane content of 30% and 20 parts of gelatin particles was prepared to form a coating layer of 30 μm in thickness on the films and finished cloths, which were immersed in hot water at 80°-120° C. for 30-120 minutes to dissolve and remove gelatin particles. Eighty nine to 98 wt % of gelatin particles contained in the coating layer were eluted, leaving pores in the layer in the manner the particles were originally contained. Moisture permeability of the films and finished cloths removed of their gelatin particles was estimated to be 3,900 g/m² in 24 hours (according to the method of JIS Z-0208 for measurement of moisture permeability).

EXAMPLE 6

Paint

Using dimethylformamide containing gelatin particles of 11 μm or smaller in size obtained in Example 1, a solution of polyurethane resin with solid content of 20% in terms of polyester base polyurethane was prepared, to which 60 wt % of gelatin powder as against the solid content was added to obtain a paint.

The paint thus obtained was applied on a steering wheel for a thickness of 20 μm, and dried at 90° C. for 2 minutes to form a paint layer. The paint layer was subjected to buffing with a sand paper to remove a thin layer therefrom. The paint thus formed had adequate moisture absorbency as well as high frictional resistance such that the hands on the wheel would not slip and secure manipulation of the wheel becomes possible.

COMPARATIVE EXAMPLE 9

Paint

A steering wheel was prepared in the same manner as in Example 6 except that no gelatin particle was added. The wheel was less susceptible to stains, but when the humidity was high, perspiration tended to adhere on the wheel and when the humidity was low, the contact resistance became too low, making hands on the wheel occasionally slip.

EXAMPLE 7

Paint

The paint obtained in Example 6 was applied on a wooden floor plank for a thickness of 30 μm, dried at 90° C. for 2 minutes, then immersed in hot water of 100° C. for 50 minutes, and pressed with a roll. Substantially 92 wt % of gelatin particles in the coating layer was dissolved into hot water when the plank was pressed with the roll, leaving multiporous coating layer on the plank. The floor plank thus provided with a coating layer was excellent in feel without tackiness and had adequate contact resistance. As the moisture in the floor plank was dissipated from the coating layer, the bottom surface of the plank did not decay by the moisture. Because of water repellent property of the coating layer, the floor plank was free from getting wet or stained.

COMPARATIVE EXAMPLE 10

Paint

A coating layer was formed on a wooden floor plank in the same manner as in Example 7 except that no gelatin particle was added. The plank was less susceptible to stains and did not absorb water, but the bottom surface remained wet as the moisture inside the plank did not dissipate. Moreover as one walked on the floor, there was a tacky feel when the humidity was high, and one occasionally slipped when the air was dry.

EXAMPLE 9

Film

Dimethylformamide containing 20 wt parts of gelatin particles obtained in Example 1 was used to dilute 30 wt parts of urethane resin, and the mixture was coated on a release paper in a thickness of 30 μm and dried. The coating layer on the release paper was subjected to buffing with a sand paper to remove a thin layer therefrom. Subsequently, the coating layer was removed from the release paper to obtain a film of 30 μm in thickness.

The film was then immersed in hot water of 85° C. for 45 minutes while pressing the film with rolls on both sides. Ninety five wt % of gelatin particles contained in the film was dissolved and removed by pressing with the rolls, leaving numerous fine pores on the film surface. The moisture permeability of the film was measured to be ca. 4,000 g/m² in 24 hours (by JIS Z-0208) and air permeability was satisfactory.

COMPARATIVE EXAMPLE 11

Film

A film was obtained in an identical manner as in Example 8 except no gelatin particle was added. Because no gelatin is added in this comparative example, elution was not conducted.

The film obtained in this comparative example was extremely low in air permeability as well as moisture permeability, and could not be used as a moisture permeable film.

EXAMPLE 9

Finished Cloth

Woven cloth of nylon fibers was immersed in a resin solution of polyester base polyurethane which was diluted to contain 20 % of solids with dimethylformamide containing ultrafine gelatin particles obtained in Example 1. The cloth was subsequently passed through rolls to form a layer of ca. 30 μm in thickness impregnated with the resin. The amount of ultrafine gelatin particles contained in dimethylformamide was set substantially equal with the solid content of polyurethane resin. The finished cloth thus obtained was immersed in hot water at 110° C. for 60 minutes and squeeze-washed. The finished cloth in Example 9 was 4,000 g/m².24 hours or more in moisture permeability. The air permeability was also good.

COMPARATIVE EXAMPLE 12

Finished Cloth

Finished cloth was obtained in the same manner as in Example 9 except that no gelatin particle was added and that dissolution and removal of the same was omitted.

The finished cloth obtained in Comparative Example 12 was extremely low both in air and moisture permeability and was therefore unsuitable as moisture permeable cloth.

EXAMPLE 10

Finished Cloth

Woven polyester cloth was coated with solution of polyester base polyurethane resin having 13% solid content in dimethylformamide, removed of the solvent in water at 20° C. while solidifying polyurethane resin, and then removed of the water. The woven cloth removed of the water was dried with hot air to form a multiporous layer on the surface.

Dimethylformamide obtained in Example 1 was blended with polyester base polyurethane resin in such a ratio that the solid content would be 20%, to prepare a solution of polyurethane resin. The polyurethane resin solution was applied on a release paper using a knife coater, dried at 90° C. for 2 minutes to form a layer of polyurethane resin with a thickness of 20 μm. In this example, the amount of ultrafine gelatin particles contained in dimethylformamide was set substantially equal to the solid content of the polyurethane resin.

The polyurethane resin layer on the release paper was laminated on the multiporous polyurethane layer of said woven cloth, heated and pressed to bond the two while removing the release paper to form a finished cloth. The finished cloth was rubbed in hot water at 110° C. for 60 minutes to dissolve and remove gelatin particles contained therein.

The finished cloth obtained in Example 10 was 4,000 g/m$^2$·24 hours or higher in moisture permeability with excellent air permeability as well.

COMPARATIVE EXAMPLE 13

Finished Cloth

Finished cloth was obtained in the same manner as in Example 10 except that no gelatin was added and that elution of gelatin was omitted.

The finished cloth according to this comparative example was 1,500 g/m$^2$·24 hours or lower in moisture permeability, and the air permeability was extremely low.

EXAMPLE 11

Finished Cloth

A release paper with grain was prepared, which was coated with a resin solution of polyester base polyurethane with solid content of 20% in dimethylformamide containing ultrafine gelatin particles obtained in Example 1, and dried with hot air at 90° C. for 2 minutes to form a polyurethane resin layer of 20 μm in thickness. The polyurethane resin solution coated on the release paper contained gelatin particles in an amount substantially equal to the solid content of the polyurethane resin.

Polyurethane adhesive with solid content of 45% was dissolved in dimethylformamide containing gelatin particles and obtained in Example 1, and the mixture was coated on the polyurethane resin layer on said release paper, and dried with hot air at 90° C. for 2 minutes. A woven polyester cloth was bonded on the surface where said adhesive was coated, and the finished cloth thus laminated was dried by heating to solidify the adhesive. The release paper was subsequently peeled off.

The adhesive used in Example 11 contained ultrafine gelatin particles in an amount substantially equal to the solid content of polyurethane in the adhesive.

The finished cloth in lamination was subjected to rubbing in hot water at 110° C. for 60 minutes to elute substantially 95 wt % of gelatin particles contained in said polyurethane resin layer and the adhesive to obtain a finished cloth with a multiporous laminar structure.

The finished cloth thus obtained was 3,000 g/m$^2$·24 hours or higher in moisture permeability with excellent air permeability.

COMPARATIVE EXAMPLE 14

Finished Cloth

A finished cloth was obtained in an identical manner to Example 11 except that no gelatin particle was added and that dissolution and removal of gelatin particle was omitted.

The resultant finished cloth was 800 g/m$^2$·24 hours in moisture permeability, and air permeability was extremely low.

As has been described in the foregoing, gelatin is pulverized in dimethylformamide or an organic solvent admixed with dimethylformamide while each particle maintaining its discrete "particulate" form in the present invention. Paints and synthetic resin solutions containing ultrafine gelatin particles according to the present invention may be prepared and used to form paint layers and coating layers on various commodities for daily use. The paints and synthetic resin solutions according to the present invention may also be used to form very thin films, which may be laminated on various types of substrates.

They may also be impregnated in various substrates. Whereby, these commodities will be provided with moisture absorbency as well as moisture and air permeability.

Although the present invention has been described to have specific preferred objects, it belongs to the known and conventional technical field and thus includes any modification or improvement having the main features of the present invention as described above and within the scope of the present invention defined by the appended claims.

What is claimed is:

1. A method of pulverizing hydrophilic, water-soluble gelatin, comprising the steps of:
   a) providing a predetermined quantity of gelatin;
   b) drying said gelatin so as to contain a water-content not exceeding 12 wt %;
   c) providing a wet pulverizing apparatus including a substantially moisture-free pulverizing chamber;
   d) charging the chamber of said pulverizing apparatus with a predetermined quantity of an organic solvent and said dried gelatin, said organic solvent selected from the group consisting of dimethylformamide and a dimethylformamide containing solvent; and
   e) wet pulverizing said dried gelatin for a predetermined time period so as to obtain gelatin particles in a predetermined size range.

2. The method of claim 1, further including the step of:
   a) subjecting said gelatin to a dry pulverization treatment, prior to said drying step, for thereby making the particles of said gelatin substantially uniform in size.

3. The method of claim 1, wherein:
   a) said charging step is carried out by charging said organic solvent prior to introducing said dried gelatin into the chamber of said pulverizing apparatus.

4. The method of claim 1, wherein:
   a) said charging step is carried out by charging said organic solvent substantially simultaneously with introducing said dried gelatin into the chamber of said pulverizing apparatus.

5. The method of claim 1, wherein:

a) said charging step is carried out by introducing blend of said organic solvent and said dried gelatin into the chamber of said pulverizing apparatus.

6. The method of claim 5, wherein:
a) the ratio of said organic solvent to said dried gelatin comprising 2:1 by weight of said blend.

7. The method of claim 5, wherein:
a) the ratio of said organic solvent to said dried gelatin comprising 1:1 by weight of said blend.

8. The method of claim 1, wherein:
a) said size range of the gelatin particles obtained by said wet pulverizing step comprises 30 microns or less.

9. The method of claim 1, wherein:
a) substantially all the air inside the chamber of said pulverizing apparatus is substituted by an inert gas prior to said charging step.

10. The method of claim 9, wherein:
a) said inert gas is selected from the group consisting of nitrogen, carbon dioxide, and dehydrated air.

11. The method of claim 10, wherein:
a) said dehydrated air includes a water content of about 10-50 ppm.

12. The method of claim 10, wherein:
a) each of said nitrogen and carbon dioxide includes a water content of about 10-20 ppm.

13. The method of claim 1, wherein:
a) said gelatin has a jelly strength of not more than about 127 Bloom (g).

14. The method of claim 1, wherein:
a) said gelatin comprises a protein derivative including a water content not exceeding 16 wt %.

15. The method of claim 1, further including the step of:
a) cooling the pulverizing chamber of said apparatus to below 60° C.

16. The method of claim 1, further including the step of:
a) maintaining a gas pressure of about 10 to about 20 mm (water column) inside the pulverizing chamber of said apparatus.

17. The method of claim 1, further including the step of:
a) adding about 2 wt % of a surface active agent prior to said pulverizing step.

18. The method of claim 17, wherein:
a) said surface active agent comprises monochlorobenzene.

19. The method of claim 1, wherein:
a) said pulverizing step is carried out for a period of about 6 hours.

* * * * *